United States Patent [19]

Bolton

[11] 4,367,634

[45] Jan. 11, 1983

[54] MODULATING HEAT PUMP SYSTEM

[76] Inventor: Bruce E. Bolton, 485 Akron Rd., Wadsworth, Ohio 44281

[21] Appl. No.: 226,507

[22] Filed: Jan. 19, 1981

Related U.S. Application Data

[63] Continuation-in-part of Ser. No. 29,325, Apr. 12, 1979, abandoned.

[51] Int. Cl.³ .............................................. F25B 27/02
[52] U.S. Cl. .................................. 62/238.6; 62/324.4
[58] Field of Search .............. 62/159, 160, 260, 324.1, 62/0.4, 238.6

[56] References Cited

U.S. PATENT DOCUMENTS

| | | | |
|---|---|---|---|
| 1,332,703 | 3/1920 | Worthen | 62/504 X |
| 2,279,657 | 4/1942 | Crawford | 62/159 X |
| 2,292,335 | 8/1942 | Durbin | 62/159 X |
| 2,720,083 | 10/1955 | Garland | 62/238.6 |
| 3,378,062 | 4/1968 | Ringquist et al. | 62/159 X |
| 3,513,663 | 5/1970 | Martin, Jr. et al. | 62/159 |
| 3,523,575 | 8/1970 | Olivieri | 62/238.6 |
| 3,636,721 | 1/1972 | Rex | 62/159 X |
| 3,959,986 | 6/1976 | Ledermann | 62/160 X |
| 4,111,259 | 9/1978 | Lebduska | 62/160 X |
| 4,134,273 | 1/1979 | Brautigam | 62/260 X |

FOREIGN PATENT DOCUMENTS 821079  9/1959  United Kingdom ................ 62/238.6

*Primary Examiner*—Lloyd L. King
*Attorney, Agent, or Firm*—Baldwin, Egan, Walling & Fetzer

[57] ABSTRACT

The invention is the design of a heat pump and heating and air conditioning system that improves the performance at part loads, and lowers the operating costs by heat storage and/or modulating the output of the system to meet the heating and cooling needs of the building. The invention uses the technologies of refrigeration, thermodynamics, fluid flow, heat transfer, and solid state electronics. The output and electric power requirements of the system are modulated by an electronic controller that can vary the speed of the compressor motor by changing the frequency of the electric power to the motor of the refrigerant compressor. The two most important components of the system, that are an improvement in the state of the art of heat pumps systems, are the design and use of a modulating thermosiphon evaporator (MTSE) and a zoned heat storage system (ZHSS). The MTSE consists of three or more controllable flow circuits with different size heat transfer co-axial coils that are designed so that the water in each coil is automatically drained when the water flow to the coil is stopped. The ZHSS consists of three or more heat storage zones each containing, heat storage tubes, a tube support and a water flow control device that meters the water flow to each flow area between the tubes. The invention permits a water to air or water to water heat pump system to operate efficiently with system heating output as low as one third of the building design load. The annual cost of electricity of a building, with a modulating heat pump system, is greatly reduced when compared with a conventional heat pump or electric furnace. The invention insures that a water to air or water to water heat pump can operate with higher, constant efficiency, at reduced heating and cooling outputs with reduced annual electric power costs, without freezing water in the evaporator.

5 Claims, 4 Drawing Figures

MODULATING HEAT PUMP SYSTEM

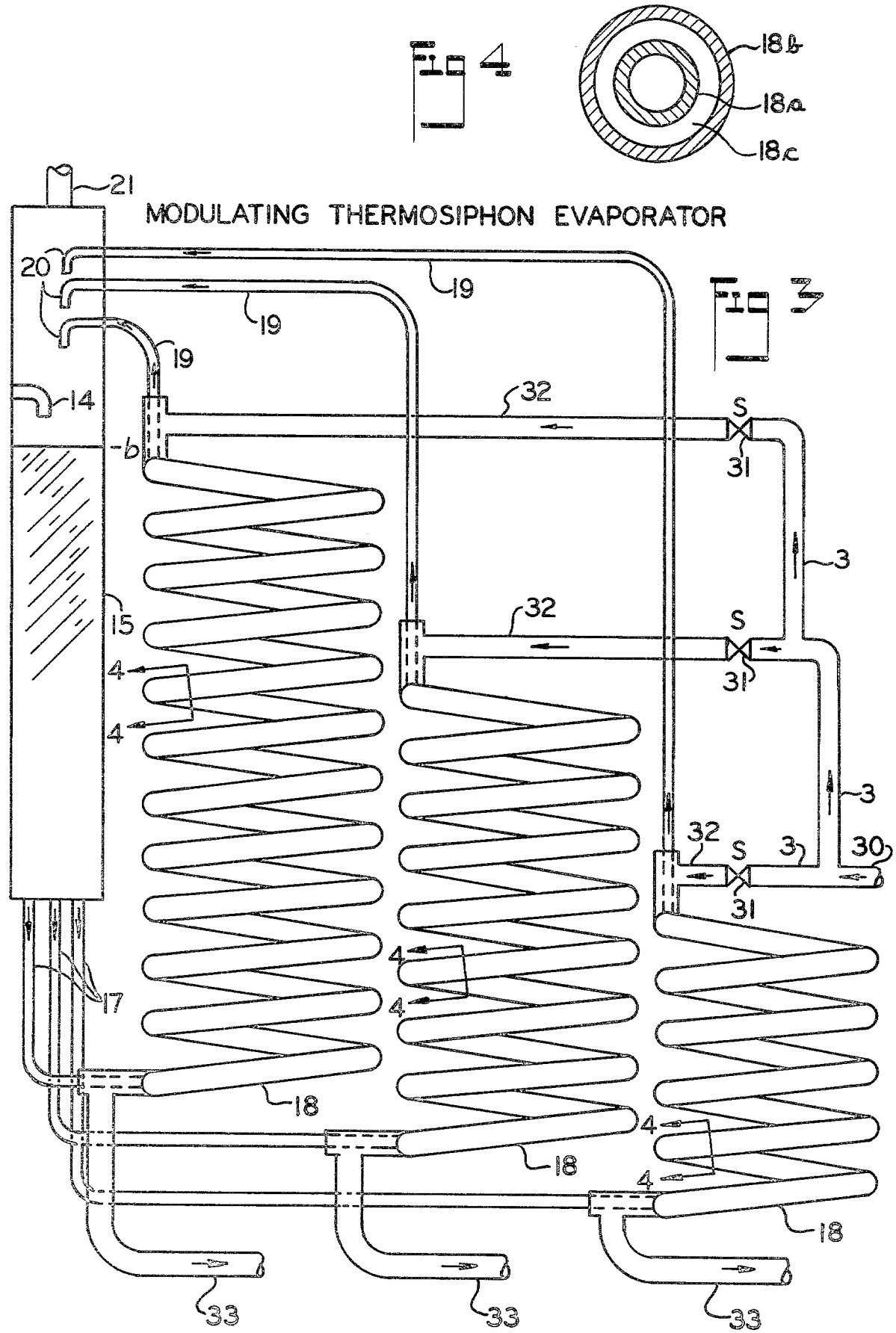

MODULATING HEAT PUMP SYSTEM

This application is a continuation-in-part application of copending Ser. No. 29,325, filed Apr. 12, 1979, now abandoned, entitled "Modulating Heat Pump System" in the name of Bruce E. Bolton.

PRESENT STATE OF THE ART

The present state of the art of unitary water to air or water to water heat pump is as follows:

1. The compressors used are hermetic with single or three phase constant speed motors. For residential application the motors are always single phase, because three phase power is not available to residential buildings.
2. With constant temperature water source the coefficient of performance (COP) and electric power input (KW) are constant at all building heating loads, and outside air temperatures.
3. All present heat pump designs use a reversing valve that reverses the flow of refrigerant through the condenser and evaporator with the changeover from heating to cooling cycle.
4. The refrigerant evaporating temperature, during the heating cycle, must be maintained high enough to prevent freezing of the water heat source flowing through the evaporator.
5. The temperature of the water heat source entering the heat pump must be above 40° F. to have sufficient temperature drop, and still be above freezing.
6. The types of heat exchangers that are used for evaporators, during the heating cycle, are as follows:
    6.1 Single co-axial copper coiled tubes with the refrigerant flowing in the annulus between the tubes. The refrigerant enters the evaporator as a liquid and vapor mixture and leaves as a vapor.
    6.2 Single co-axial coiled tubes with the refrigerant flowing in the inner tube. The inner tube is cupronickel and the outer tube is plastic. The refrigerant enters the evaporator as a liquid and vapor mixture and leaves as a vapor. This type of evaporator is more corrosion resistant and cannot be damaged if the water freezes.
7. The heat pumps may use a thermostatic expansion valve or capillary tube in the refrigerant line to the evaporator.
8. The most advanced heat pump design controls the compressor discharge pressure by varying the flow of water through the evaporator. This control method gives constant cycle output and prevents tripping out of the compressor due to overtemperature of the refrigerant.
9. The present state of the art of heat pump design, as described above, has the following inherent operating conditions and disadvantages that must be designed against if the performance, COP, and operating costs are to be improved:
    9.1 The pressure drop of the refrigerant through the evaporator is 3 to 9 PSIG. The heating COP of the cycle would be higher if there were no pressure drop through the evaporator.
    9.2 The transfer of heat, in the evaporator, from the water to the refrigerant is restricted because of the high vapor phase of the refrigerant flowing through the evaporator. If the liquid phase can be increased throughout the evaporator, the heat transfer rate would be increased.
    9.3 The transfer of heat, in the evaporator, from the water to the refrigerant is restricted because of the low velocity and mass flow of the refrigerant. The mass flow through the evaporators described in Paragraphs 6.1 and 6.2 is the same as the mass flow through the compressor and cannot be varied. If the velocity and mass flow of the refrigerant through the evaporator can be increased, the heat transfer rate would be increased.
    9.4 The evaporator temperature, during the heating cycle, must be maintained above the freezing point of water to prevent freezing of water in the coil. If the evaporating temperature of the refrigerant can be reduced to 20° F., the heat transfer rate could be increased, and the water flow rate through the heat pump could be reduced.
    9.5 The motor-compressors of all present residential heat pumps operates at one speed only at all buildings heating and cooling loads. The electric power (KW) is the same for all loads.
    9.6 If the mass flow of the refrigerant in the cycle could be reduced, by reducing the speed of the compressor, the single coil evaporator cannot be used because the log mean temperature difference (LMTD) is reduced and will lower the temperature of the water below freezing. This is true because the LMTD is equal to Q, heat transfer rate (BTU/HR), ÷by U×A (tube surface area). At $\frac{1}{3}$ load, Q is reduced by $\frac{2}{3}$, and U and A remain about the same, therefore, the LMTD must be reduced by about $\frac{2}{3}$ and the exit water temperature would be reduced below freezing.
    9.7 If the mass flow of the refrigerant is reduced, the single thermostatic expansion valve (TEV) cannot be used because one size of TEV cannot operate at full load mass flow and at $\frac{1}{3}$ load mass flow because the range of mass flow is too large. This statement is true for heat pumps with evaporator loads of above eight tons or less.
    9.8 The capillary tube operates on the principle that liquid passes through it much more readily than gas. It consists of a small diameter tube which controls the flow of refrigerant in the system, and connects the outlet of the condenser to the inlet of the evaporator. The flow of refrigerant (#/HR) through the capillary is a function of the diameter and length of the tube, and the inlet and outlet pressure. Inherently a capillary does not operate efficiently over a wide range of conditions, therefore, the capillary cannot be used if the refrigerant flow rate is varied from the full load design condition to one third of full load flow and other pressure and temperature design conditions are to be maintained.

BRIEF DESCRIPTION OF THE DRAWINGS

FIG. 3 is an elevational view of a modulating thermosiphon evaporator showing three controllable coaxial, helical coils and the refrigerant liquid-vapor separation tank. The figure shows the flows of refrigerant and water through the MTSE and is of the same design and construction as shown in FIG. 1 and FIG. 2; and FIG. 4 is a typical section through each coil taken on line 4—4 of FIG. 3 and shows the inner and outer tubes of a coaxial coil forming an annulus therebetween.

DETAILED DESCRIPTION OF THE INVENTION

Figure 1:
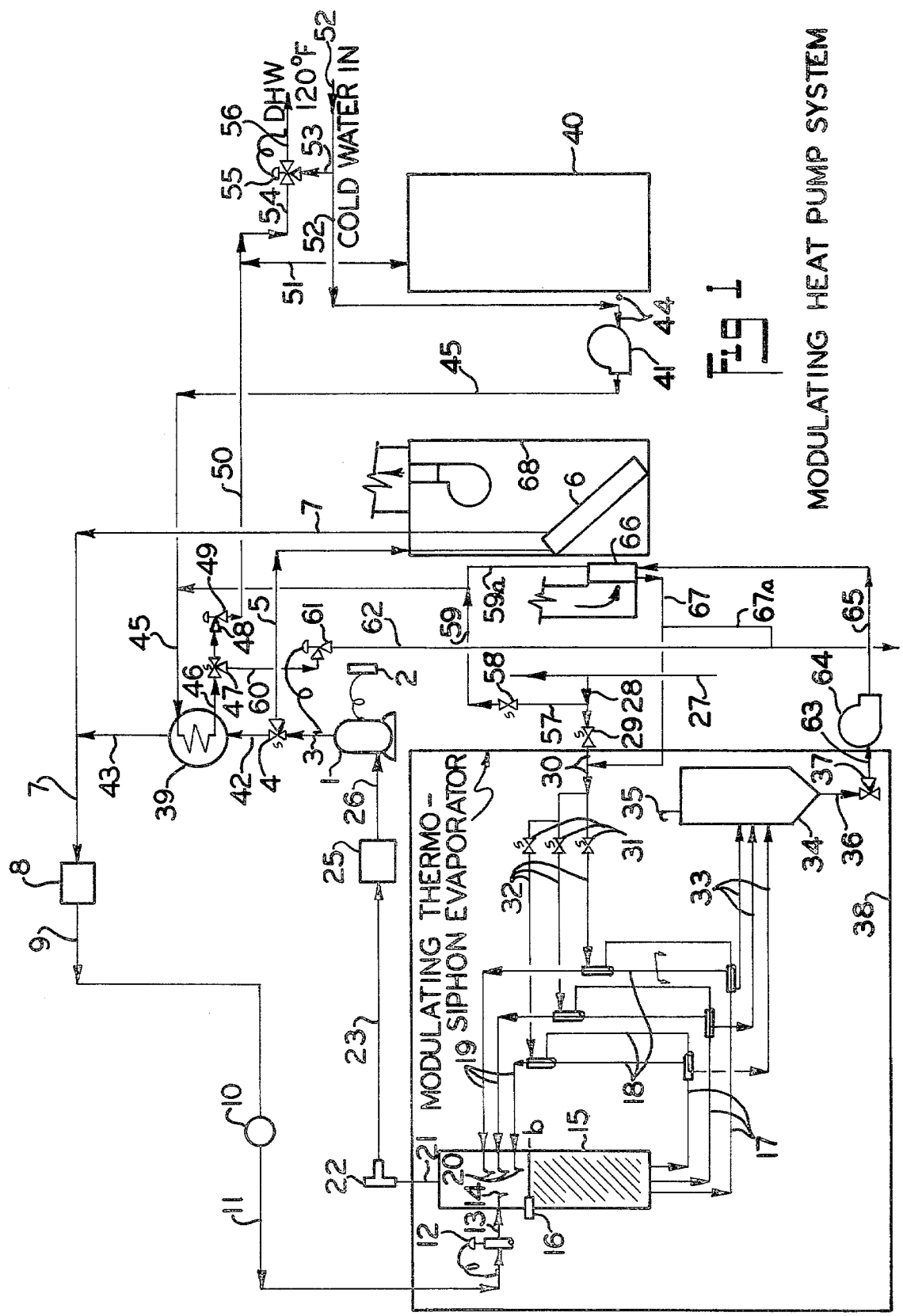
FIG. 1 is a schematic drawing of the basic modulating heat pump system showing the major parts and the fluid flow of the system.

The modulating heat pump system (MHPS) invention is further described as follows:

FIG. 1 shows the MHPS designed to use well water as a heat source to produce heat for heating a building, cold water for air conditioning, and to produce domestic hot water. This design does not include equipment to store heat, for heating the building, or equipment to store cold water for cooling. This MHPS is intended to be installed in areas that have load management or demand energy rates. The components and fluid flows of a typical system are described as follows:

The speed of conventional refrigerant motor-compressor 1, such as model YRB-300 TFC manufactured by the Copeland Corp. of Sidney, Ohio, is controlled by conventional solid state adjustable frequency AC motor control 2, such as model Ramsey 3 manufactured by the Ramsey Controls Inc. of Mahwah, N.J. The electrical signals necessary to control the motor control 2, and pumps and solenoid valves of the MHPS, comes from a conventional outdoor temperature sensor, a convenient clock thermostat, such as model #T882A manufactured by the Honeywell Corp. of Minneapolis, Minn. and a conventional energy manager control such as model #C-200 manufactured by the Independent Energy Inc. of East Greenwich, R.I. When the speed of a refrigerant positive displacement compressor is reduced the mass flow of refrigerant (#/HR), electrical power to the motor, heat into the evaporator, and heat out of the condenser are all reduced in proportion to the reduction in compressor speed. The operating pressures and temperature of the refrigerant cycle remains approximately the same regardless of the compressor speed.

During the heating cycle the refrigerant flows from compressor 1, through pipe 3, solenoid valve 4, pipe 5, heating exchanger 6, (in fan-coil housing 68), pipe 7, dryer 8, pipe 9, sight glass 10, pipe 11, flow control valve 12, pipe 13, liquid-vapor separator 14, into liquid-vapor separation tank 15. From tank 15 the liquid refrigerant flows through pipes 17, into the inner tube 18a of each of three coaxial heat transfer coils 18, discharge pipe 19, liquid-vapor separator 20 and back into liquid-vapor separator tank 15. From tank 15 the refrigerant as a vapor flows through pipe 21, pressure regulating valve 22, pipe 23, filter 25, which removes any foreign particles and retains the refrigerant as a vapor, pipe 26 and back to compressor 1.

The fan-coil housing 68, with heating coil 6, can be a standard air handler model #BWE930G as manufactured by the General Electric Co. The conventional flow control valve 12 such as model #625 manufactured by the Controls Company of America of Milwaukee, Wis. controls the flow of refrigerant into the separator tank 15 to maintain the level of refrigerant in the tank to a preset level. When well water (or other heat source fluid) flows through one or more coils, the liquid refrigerant partially vaporizes and the liquid refrigerant recirculates by the thermosiphon principle between the separation tank 15 and coils 18. When the vapor-liquid refrigerant mixture leaves the liquid-vapor separator 20 and enters the separation tank 15, the vapor separates from the liquid and flows up and out of the tank through pipe 21, and the liquid refrigerant flows to the bottom of tank 15 to be recirculated through the heat transfer coils 18. When water is now flowing through one or more coils as shown in FIG. 3, the refrigerant in that coil will not vaporize or flow. This is so because if water is not flowing in the annulus of a coaxial coil then there is no source of heat and the thermosiphon principle cannot operate. It is understood that the thermosiphon princple operates by having a difference in fluid density between two vertical columns as for example, between tank 15, vertical portions of pipes 17 and one or more of the coaxial coils 18 and vertical portions of pipes 19 in the present thermosiphon structure that are interconnected at their bottom and top parts respectively. When two columns of fluids are at the same temperature and heat is added to one column the fluid in that column will increase in temperature and when it exceeds the boiling point some of the fluid will start to boil and the density of the fluid in that column will be reduced. When the density of the fluid in the boiling column has been reduced to a level where the sum of the flow resistance is less than the hydrostatic driving force in the other column, the thermosiphon principle will start and the fluid will recirculate between the two columns.

The liquid-vapor separators 20 are standard 90° pipe elbows joined to the ends of pipes 13 and 19 and located in the separation tank 15. The liquid and vapor refrigerant separate by the action of the refrigerant changing direction and striking the wall of the pipe elbow.

During the heating cycle the well water flows from the well water pipe 27 to pipe 28, solenoid valve 29, pipe 30, one or more solenoid valves 31, pipes 32, the outer coil 18b of the coaxial coils 18, or more precisely, through the annulus 18c between the inner and outer tubes of said coils. The water leaves each coil at a temperature of about 32° F. and flows through pipes 33 into water drain tank 34, pipe 36, solenoid valve 37, and pipe 38 that drains the water back to the ground by use of a second well or other means. When the flow of water to one or more coils 18 is stopped by closing the solenoid valve 31 on one or more coils the water in that coil will automatically drain into water drain tank 34. The design of water drain tank 34, with air vent 35 and cone shaped bottom, is such that any water flowing into the tank from one or more pipes 33 will automatically drain from the tank so that no water will remain to freeze if the water temperature is below the freezing point.

The MHPS generates domestic hot water (DHW) each night at a set time and stores the hot water in the DHW tank 40 for use when needed.

DHW is generated in the condenser coil 39 and is recirculated to the DHW tank 40 by pump 41 through pipe circuit, pipe 45, coil 39, pipe 46, solenoid valve 47, pipe 48, temperature regulating valve 49, pipes 50 and 51, tank 40, pipe 44, and pump 41. To generate DHW, and cold water for the cooling cycle, the refrigerant from the compressor 1 is diverted through pipe 42, coil 39 and pipe 43, by a three-way solenoid valve 4, and then flows through the refrigeration cycle the same as for the heating cycle.

During the generation of DHW the water flow rate through the condenser coil 39 is controlled by the temperature regulating valve 49 in such a manner to change the water flow to permit only 140° F. water to flow through the valve.

When DHW is required in the building, well water flows through the system by circuit consisting of pipes 52 and 44, DHW tank 40, pipes 51 and 54, thermo-mixing valve 55, and DHW pipe 56 to the building. When the temperature of the hot water entering the thermo-mixing valve 55 is higher than 120° F., the valve will draw colder water from pipes 52 and 53 to limit the DHW to the building to 120° F.

A suitable refrigerant for use in the present system is FREON-22. Referring to FIG. 1, the pressure and temperature of this refrigerant as it enters compressor 1 is 57.7 psia and 20° F. and upon exiting from the same, the pressure and temperature is about 225.5 psia and 145° F.

This refrigerant, which is a super heated vapor, enters into heat exchanger 6 where the superheat and heat of vaporization is removed from said refrigerant at a condensing temperature of 105° F. This refrigerant then flows through pipe 7 to dryer 8, pipe 9 and then to sight glass 10, and pipe 11.

Refrigerant in pipe 11 is typically a liquid at about 105° and goes through flow control valve 12 in which the refrigerant expands and drops in pressure—typically from about 225.5 psia to 57.7 psia.

Control valve 12 has liquid control sensor 16 and senses the liquid level in tank 15.

Figure 2:
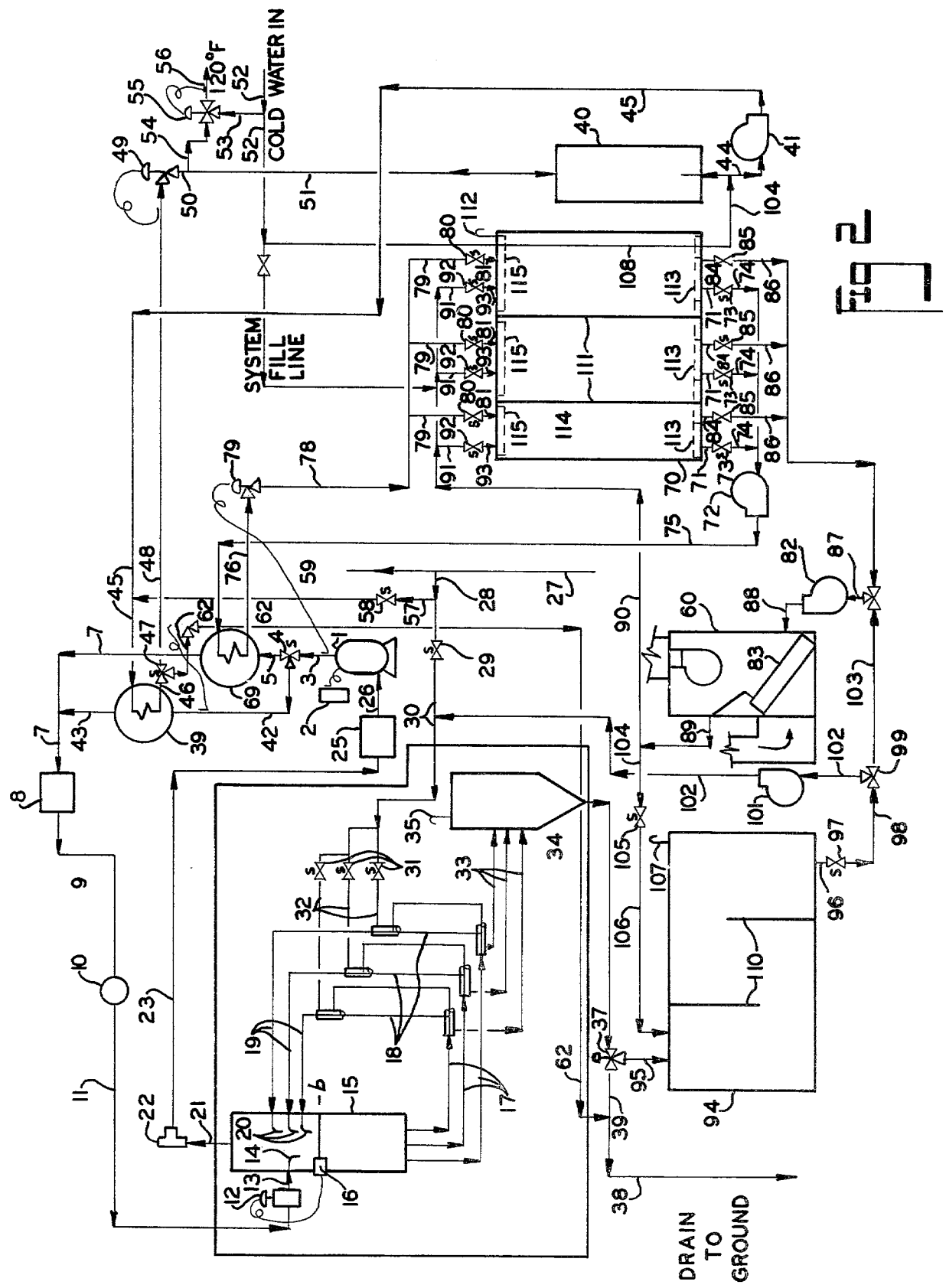
FIG. 2 is a schematic drawing of an alternate configuration of the modulating heat pump system that includes equipment to store heat and cold at night for use when needed to heat or cool a building.

If liquid level of said tank is low, valve 12 opens correspondingly and modulates the flow to return the liquid level to preset level b as indicated in FIGS. 1-3.

As the refrigerant enters tank 15 at 57.7 psia the liquid phase is added to the liquid refrigerant already in the tank and the vapor phase then rises and goes out through pipe 21.

The liquid phase of said refrigerant in tank 15 flows out the bottom through pipes 17 and into the inner coil of each of the coaxial coils 18, i.e., the inner coil of the coil within a coil structure.

The refrigerant then flows through pipes 19 and back into the tank 15 whereat its liquid phase rejoins the liquid in the tank and its vapor phase then separates and flows up and out through pipe 21.

The structure as shown in FIG. 3 represented by the closed system, i.e., the tank 15, pipes 17, inner coils of the coaxial coils 18, pipes 19, represent what is called, as previously mentioned, a thermosiphon system in which the refrigerant picks up heat from the liquid flowing through the outer coils of the coaxial coils 18 resulting in the refrigerant being partially converted into a vapor which the refrigerant picks up the heat of vaporization and becomes a mixture of liquid and vapor at a lower density.

During this period the temperature of the refrigerant is at typically about 20° F. (i.e., the evaporation temperature).

The vapor phase of this refrigerant enters tank 15 through separators 20 as aforementioned to join with the vapor phase entering said tank through the pipe 13 and separator 14.

The liquid phase rejoins the liquid in the tank 15 at a temperature of about 20° F. and continues to recirculate through the thermosiphon circuit.

During the cooling cycle, well water or water from the DHW tank 40 flows through the condenser coil 39 to remove the waste heat of the building air conditioning. If DHW is required for storage, water is recirculated through the closed loop circuit DHW tank 40, pipe 44, pump 41, pipe 45, condenser coil 39, pipe 46, solenoid valve 47, pipe 48, temperature regulating valve 49, pipe 50, and pipe 51 back to tank 40. If DHW is not required for storage, well water from well water pipe 27 is circulated through the condenser coil 39 by pipe circuit; well water pipe 27, pipes 28 and 57, solenoid valve 58, pipes 59 and 45, condenser coil 39, pipe 46, solenoid valve 47, pipe 60, water flow control valve 61, pipes 62 and 38 and back to the ground by second well or other means.

The building is air conditioned by recirculating water through a piping circuit consisting of evaporator coils 18, pipes 33, water drain tank 34, pipe 36, solenoid valve 37, pipe 63, pump 64, pipe 65, heat exchanger 66, pipes 67 and 30, solenoid valves 31, pipes 32, and back to the coils 18.

FIG. 2 shows the alternate MHPS designed to use well water as a heat source to produce heat for heating a building, cold water for air conditioning, and domestic hot water. This design does include equipment to store heat for heating the building, and equipment to store cold water for cooling. The heat storage equipment is the ZHSS and is an improvement in the state of the art of heat storage equipment design. This MHPS is intended to be installed in areas that have time of day rates (TODR). The components of the system are described as follows:

The alternate MHPS has the same refrigerant flow circuit as FIG. 1, except that during the heating cycle the refrigerant flows directly through a water cooled condenser coil 69 instead of heating coil 6.

The water flowing through the condenser coil 69 is recirculated through the heat storage unit 70 by pump 71 by the open circuit consisting of heat storage unit 70, pipes 72, solenoid valves 73, pipes 74, pump 71, pipe 75, condenser coil 69, pipe 76, water flow control valve 77, pipe 78, pipes 79, solenoid valves 80, pipes 81, and back to heat storage unit 70. The heat to be stored is generated by the MHPS during off peak periods using lower cost electricity priced with TODR.

When heat is required to warm the building, hot water is recirculated through an open circuit consisting of one of the zones of heat storage unit 70, pipe 84, solenoid valve 85, pipes 86 and 87, pump 82, pipe 88, heat transfer coil 83, pipes 89, 90, 91, solenoid valve 92, pipe 93, and back to heat storage unit 70.

During the cooling season cold water is generated by the MHPS during off peak periods and stored in the cold water storage tank 94. The flow of water is through an open circuit consisting of evaporator coaxial coils 18, pipes 33, water drain tank 34, pipe 36, solenoid valve 37, pipe 95, cold water storage tank 94, pipe 96, solenoid valve 97, pipe 98, solenoid valve 99, pipe 100, pump 101, pipes 102 and 30, solenoid valves 31, pipes 32 and back to coils 18.

When air conditioning is required, cold water is recirculated through an open circuit consisting of cold water storage tank 94, pipe 96, solenoid valve 97, pipe 98, solenoid valve 99, pipes 103, and 87, pump 82, pipe 88, heat transfer coil 83, pipes 89 and 104, solenoid valve 105, pipe 106 and back to tank 94.

The circuits for the flow of well water for the generation of hot water for storage, cold water for storage, and domestic hot water are identical to circuits previously described for the basic MHPS. The only exception is that the cold water in pipe 52 flows through a DHW preheat coil 108 in heat storage unit 70, and then pipes 109 and 44 before entering DHW tank 40.

The cold water storage tank 94 is constructed with air vent 107, water mixing baffles 110 and holds about 1,000 gallons of water.

The heat storage unit 70 is divided into three or more zones of different size by dividers 111, and each zone contains air vents 112, perforated tube support plate 113, matrix of small one inch diameter plastic heat storage tubes 114, with caps on each end and containing a salt hydrate material (sodium thiosulfate pentahydrate), and water distribution pans 115 that rest on and are supported by the tops of heat storage tubes 114. The bottom of each pan 115 has holes 1"×1" on centers sized and shaped to give the desired water flow rate to the flow area between each set of four tubes.

The heat storage unit 70 with multi-zones and two inlets and two outlets in each zone permits heat to be stored in one zone at the same time that heat is removed from another zone for heating a building. Storing heat in smaller size multi-zones also results in higher average zone temperatures in a shorter period of time.

Advantages of the MHPS

The following design and operating characteristics are reasons why the MHPS will have lower annual operating costs of electricity when compared with the conventional air to air heat pump system.

1. The MHPS uses less annual electric power (KWH) because of the following:
   1.1 The MHPS uses geothermal energy from constant temperature water from heat wells, water wells, or other source of warm water.
   1.2 The MHPS has a higher seasonal performance factor because it is designed and controlled to give modulation of the following fluid systems:
      a. The speed of the compressor can be controlled in six stages to vary the refrigerant flow (#/HR) from 33% to 114% of the flow required to produce the design heating capacity.
      b. The water heat source flow rate to the evaporator can be varied in six states from 33% to 114% of the flow required to supply the energy necessary to produce the design heat capacity.
      c. The stopping of water flow to one or more evaporator coils reduces the heat transfer surface area in use so that the evaporator surface area is modulated from 33% to 116% of the area required to produce the design heating capacity.
      d. The flow rate of the domestic hot water to the condenser coil 39 can be varied to regulate the exit temperature to the temperature required.
      e. The flow rate of the well water to the condenser coil 39, during the cooling cycle, can be varied to regulate the compressor discharge pressure to the refrigerant pressure required.
      f. The speed of the compressor can be varied to vary the refrigerant flow (#/HR) from 38% to 100% of the flow required to produce the design cooling capacity required.
   1.3 The MHPS does not require auxiliary electric resistance heating coils to help heat the building when the outside air temperature is low.
   1.4 The MHPS can in winter generate DHW at about one-third the KWH required by an electric water heater, and, if TODR are available, the DWH generated and stored at night will use lower electric rates.
   1.5 The MHPS can in summer generate DHW at the same time that cold water is generated for air conditioning the building. The waste heat of the cooling cycle is used to heat DWH, therefore no additional KWH or electricity costs are required.
   1.6 The MHPS can use a three phase motor to drive the compressor even though single phase electricity is supplied to the building. The three phase motor compressor will use about four percent less KWH than a single phase motor compressor of the same BTU/HR rating.
   1.7 With the MHPS the temperature of the building can be set back at night to save 9 to 19% of the cost of heating (based on 68° day, 60° at night).
   1.8 The MHPS does not require a defrost cycle which can increase the heating KHW by 6 to 9% for an air to air heat pump system.
   1.9 If TODR are available, the alternative MHPS can generate and store heat, by use of the ZHSS, at night for use in heating the building when needed.
   1.10 If TODR are available, the alternate MHPS can generate and store cold water at night for use in air conditioning the building when needed.
2. The MHPS is designed and controlled to have a lower average billing load (KW), and for areas that have a load management or demand energy rate, the cost of electricity will be lower because of the following:
   2.1 The generation of DHW and heat for heating the building are done during separate time periods.
   2.2 The generation of DHW and cold water for air conditioning is done during the same time period, and at no higher KW than required for air conditioning. DHW can also be generated at night in the summer, if air conditioning is not required.
   2.3 The generation of DHW is done at a reduced compressor speed with a KW load of about one-half that of a standard electric water heater.
   2.4 During mild winter weather months the MHPS can heat the building with a lower KW load because the motor-compressor is run at a lower speed to match the heat generated with the heat loss of the building.
   2.5 During mild cooling months the MHPS can cool the building with a lower KW load because the motor-compressor is run at a reduced speed so that the cooling water generated will match the heat gain of the building.
   2.6 The MHPS generates and stores DHW at night (or other time period) when there is no other major KW load such as electric clothes dryer, or electric range and oven.

Description of the Modulating Thermosiphon Evaporator (MTSE)

The thermosiphon principle is not new, and has been used for many years for chemical process plant reboilers, and industrial and commercial refrigerant system evaporators. The thermosiphon heat exchanger has been designed with horizontal or vertical tubes and with the fluid to be vaporized on the inside or outside of the tubes. The thermosiphon heat exchanger recirculates the fluid to be vaporized because of the differences in density of the liquid in the inlet column and the liquid and vapor mixture in the heat exchanger. The recirculating ratio is attained when the sum of the resistance in the vaporization circuit is equal to the hydrostatic driving force of the inlet liquid. The description of the MTSE as is shown in FIG. 3 is as follows.

1. The MTSE is designed with multiple controllable flow circuits. The optimum form of the MTSE is to use multiple coaxial coils 18, in parallel flow, with the refrigerant on the inside of the center tubes 18a and the heat source fluid in the annulus 18c between the tubes 18a and 18b. A typical MTSE designed for a small building would have three coils with heat transfer surface areas of 16%, 33%, and 66% of the total area required for the design heating load of the building. A typical coaxial coil 18 is comprised of a ¾" outside diameter inner tube 18a disposed centrally within a 1" inside diameter outer tube 18b to provide a ¼" annulus for water flow. Thus far with this tube within a tube construction and assuming a design heat loss of 46,700 BTU/HR and further considering the middle coil having a surface of 33% of the total area required, a lineal length of approximately 25 feet is required for this middle coil, which is helically coiled, the typical diameter of which may be 10 inches.

This helical coil is designed to absorb approximately 12,300 BTU/HR from the water.

Assuming a refrigerant recirculation ratio, i.e. liquid to vapor, of 5 to 1, the calculated pressure drop through this coil is approximately 1.4 psi and the hydrostatic head to recirculate the refrigerant through this coil is approximately 2 psi. Hence, for a balanced system, the refrigerant recirculation ratio will be somewhat higher than 5 to 1. It is therefore possible to modulate the heat transfer area in use by using different combinations of coils to give six stages to approximately match the heating load of the building.

2. The flow of refrigerant in each coil is dependent on the vaporization (boiling) of the refrigerant in that coil and is independent of the conditions in the other coils. To vaporize the refrigerant in a coil it is necessary that water flows through that coil. If water is flowing through all three coils then part of the refrigerant in all three coils will be vaporized and refrigerant will recirculate through all coils. If the flow of water to one or more coils is stopped, then the water will drain from the coil or coils, the transfer of heat will stop, the vaporization and flow of refrigerant in the coil or coils will stop, and the MTSE will be modulated.

3. The components of the MTSE that make the invention an improvement in the state of the art of heat exchanger (evaporator) design as shown in FIG. 3 are as follows:

3.1 A vapor-liquid separation tank 15 with vapor-liquid separators 14 and 20, vapor outlet 21 at top, liquid level sensor 16, and liquid outlets 17 at bottom.

3.2 Multiple graduated fluid flow circuits consisting of different vertical heights of helical coaxial coils 18, with separate liquid inlets 17 at bottom, and separate liquid vapor mixture outlets 19 at top, to the vapor-liquid separation tank 15.

3.3 Separate water inlets 32 and flow control valves 31 to top of each coil 18 (circuit).

3.4 Separate water outlets 33 at bottom of each coil 18 (circuit) connecting directly to vented water drain tank 34.

3.5 A liquid-vapor flow control valve 12 that controls the flow of refrigerant to the separation tank 15, to maintain the liquid level in the tank. The control valve 12 is wired to and electrically controlled by the liquid level sensor 16 in the separation tank 15.

Advantages of the MTSE

Advantages of the modulating thermosiphon evaporator (MTSE) as used with the MHPS:

1. There is no pressure drop (PSI) between the refrigerant entering and leaving the MTSE because the refrigerant enters and leaves in the vapor-liquid separation tank. The pressure drop of vapor-liquid refrigerant flowing through the coils is overcome by the hydrostatic driving force of the inlet liquid refrigerant column. The elimination of pressure drop through the evaporator increases the seasonal performance factor (SPE) of the MHPS.

2. The average heat flux, BTU/HR-FT$^2$, is higher than all other types of evaporators because of the following:

2.1 The high recirculation of the refrigerant due to the thermosiphon principle produces higher fluid mass flow, #/HR, and flow velocities.

2.2 The MTSE operates at all times, throughout the lengths of all tubes, with high liquid (low vapor and quality) refrigerant flow, therefore, part of the heat transfer will be by nucleate boiling which produces one of the most efficient means of heat transfer.

2.3 The use of helical coils permits higher average heat flux, because the vortex flow produces higher heat transfer coefficients due to increased velocity, and secondary flow produced by the radial body forces of the swirl flow.

2.4 The MTSE operates at a constant heat flux at all loads because at part load, when the refrigerant flow #/HR is reduced, the heat transfer surface area is also reduced by stopping water flow to one or more coils. This cannot be done with an evaporator with a single flow circuit.

2.5 The multiple coils of the MTSE with constant heat flux BTU/HR/FT$^2$, at part loads, permits the MHPS to operate with an evaporation temperature as low as 20° F. without freezing the water and gives a higher and constant LMTD at all loads of the MHPS. This is not possible with all other types of evaporators with water heat source.

3. Because of the higher heat flux, the required heat transfer BTU/HR can be obtained with far less heat transfer surface area than other types of evaporators.

4. The MTSE can react faster, than all other types of evaporators, to the reduction of refrigerant flow (at part loads) because of the automatic draining of the water in one or more coils.

5. The use of multiple coils and automatic draining of the water in one or more of the coils, when the MHPS is at part load or not in operation, prevents the water from freezing in the coils.

6. The amount of water required to flow through the MTSE is less, at all loads, than all other types of evaporators because of the following:

6.1 Each coaxial coil is designed to have a lower exit water temperature. Since the quantity of water required, in gallons per minute (GPM), is inversely proportional to the difference in entering and leaving temperature ($\Delta T$), the lower the leaving temperature, the higher the $\Delta T$, and therefore the required GPM of water can be lower to supply the required heat transfer, BTU/HR. Lower leaving water temperatures are possible with the MTSE because of the following:

a. The MHPS refrigerant cycle is designed with an evaporating temperature below the freezing point of water.

b. The automatic draining of water in each coil when not in operation.

c. The water temperature leaving each coil in operation does not change when the MTSE operates at part load, because the refrigerant flow, #/HR, and heat flux, BTU/HR-FT$^2$, in each coil, at part loads, remains constant. This is not possible with the use of a single circuit evaporator.

6.2 When the MTSE is required to operate at part load, the water flow to one or more coils is stopped, and the GPM of water flowing through the MTSE is reduced. The water flowing through the MTSE can be at six different flow rates and can be as low as 33% of the flow required for full load.

Description of the Zoned Heat Storage System (ZHSS)

The ZHSS is a heat storage system designed to use a salt hydrate as the heat storage material. Salt hydrates have high heat of fusion and can store a large amount of heat in a small volume. The heat stored in the ZHSS is transferred to and from the storage unit by water. The ZHSS is further described as follows.

The ZHSS has three or more zones for storing heat. Dividing the storage unit into zones is important because of the following.

Filling smaller size zones results in higher average zone temperatures in a shorter period of time.

With more than one zone it is possible to fill one zone at the same time as heat is being removed from another zone.

During mild weather it is possible to fill and remove heat from only the small size zone which results in the reduction of electricity used.

Each zone of the storage unit is filled with vertical salt hydrate filled plastic tubes capped at both ends. Each tube is supported at its bottom, thus eliminating bending or local stresses at support points that would result if the tubes were supported horizontally.

The ZHSS includes a system of tube supports that permits each tube to be supported separately. A rectangular perforated support plate, with 3" long support legs, is placed in the bottom of each zone to support the tubes and form a water outlet chamber. This tube support system also permits the tubes to expand freely upward when heated up.

To prevent laning of water between the outside rows of tubes and the side walls of each zone, soft closed cell plastic foam is fastened to the walls and dividers of all zones.

The ZHSS includes a system to meter water uniformly to all the water flow areas between the tubes. This is accomplished by placing plastic distribution pans in the water inlet chamber at the top of the tubes in each zone. The bottom of each pan has holes 1"×1" on centers sized and shaped to give the desired flow rate to each flow area. The distribution pans are supported by but not fastened to the tops of the tubes in each zone.

Advantages of the ZHSS

The design of the ZHSS is an improvement in the state of the art of heat storage unit design because of the following.

The design of the ZHSS permits heat to be transferred to and from the storage unit at a higher rate because of the following.

The unit is divided into smaller zones. This results in a higher velocity of water, in feet per second, over the surface of each tube, which results in higher heat transfer rates.

The ZHSS uses water to transfer heat to and from each zone. The heat transfer rate is higher than units with air as the heat transfer fluid because the overall heat transfer coefficient between the salt hydrate and the tube wall is five times higher with water than with air.

The use of small diameter, closely spaced tubes with the heat transfer fluid on the outside of the tubes results in a high tube surface area to salt hydrate volume ratio. The higher this ratio is, the higher the heat transfer rate will be.

The flow of water between the tubes in the downward direction will greatly reduce the pressure drop through the unit because of the force of gravity on the water.

The tubes in the ZHSS are filled with a salt hydrate that melts at 119° F. This material, sodium thisulfate pentahydrate ($Na_2S_2O_3.5H_2O$), can store heat in 18% of the volume and 25% of the weight of water to store the same amount of heat.

Alternate Air Conditioning Method

The basic and alternate MHPS, as shown in FIG. 1 and FIG. 2, use the MTSE and the refrigerant cycle to air contition the building. As an alternate it is possible, in some locations, to pump well water directly to water coil 66 or 83 to cool the building. For this alternate cooling method the MTSE and refrigerant cycle are not used. As an example, refer to FIG. 1 where well water would flow through pipes 59, 59a directly to cooling coil 66 instead of condenser coil 39. The water leaving coil 39 would flow through pipe 67, pipe 67a and pipe 62 directly to pipe 38 and returned to the ground by a second well or other means. The well water cooling method can be used in locations that have well water not higher in temperature than approximately 55° F.

Evaluation of the MHPS

The operating conditions of a typical home installation of the basic MHPS (FIG. 1) are shown in Table 1. Shown are the ranges of operating conditions modulation for the months of October and January. The system is designed for an area that has a load management rate and no TODR.

The electric load and cost analysis of the Ohio Edison Company load management rate #16 is shown on Table 2. A summary of the monthly cost factors based on the energy costs of the electric furnace are as follows:

| Month | Heat Pump Air to Air | Heat Pump Water to Air | Modulating Heat Pump |
|---|---|---|---|
| October | 1.51 | 1.48 | 2.41 |
| January | 1.29 | 2.19 | 3.3 |
| March | 1.76 | 2.08 | 3.2 |

The values for the water to air heat pump are based on a heat pump manufactured by the Vaughn Corp., with the compressor running at constant speed and a single circuit evaporator.

The bar charts shown in Table 3 compares the month cost of energy for the four heating systems shown in Table 2 and the energy costs for the same home with a gas oil fired furnace. The costs shown do not include the extra monthly loan amortization costs for systems with higher initial costs.

The MHPS has lower energy costs, however, the installation costs for the MHPS is higher than the other systems. The extra system costs that can be spent to break even with the first year energy cost savings are shown in Table 4.

The energy cost reduction for the seven months shown, of the MHPS when compared to the air to air heat pump system is 52.7%. The MHPS has a 34.9% less energy cost than the conventional water to air heat pump, which is the present state of the art for water to air heat pumps.

The energy cost reduction, for the seven months shown, of the MHPS when compared to the gas fired furnace is 39.4% and 59.8% when compared to the oil fired furnace.

The lower monthly energy costs for the MHPS, as shown in Tables 2 and 3, when compared to the conventional water to air heat pump, are realized because of the lower KWH and the lower monthly billing load, KW. For areas that do not have load management rates, or demand energy rates, the reduction in monthly costs could not be as high as shown.

The design data and operating conditions of a typical heat storage unit of the ZHSS is shown in Table 5. This design is for a home with a heat loss of 40,000 BTU/HR, and requires 6.9 hours to fill to capacity, and when full contains enough heat to heat the house for 13.8 hours.

Alternate Source of Heat

The MHPS as shown in FIG. 1 and FIG. 2 is designed to use a fluid source of heat. The MHPS may in addition to the fluid source of heat, use DC electricity generated from the sun or wind as a supplemental alternate energy source of heat. The DC electricity generated by the sun would be by the use of photovoltaic panels, and the wind would be by the use of a wind turbine with a DC alternator. The DC current would be used to heat one or more MTSE coils 18 by resistance heating the inner copper pipe from the inlet pipe 17 to the outlet pipe 19. This is accomplished by connecting electric wires to pipe 17 and 19 to complete the electrical circuit with the DC electricity generator, and electrically insulate pipe 19 from tank 15 at the point where pipe 19 enters tank 15.

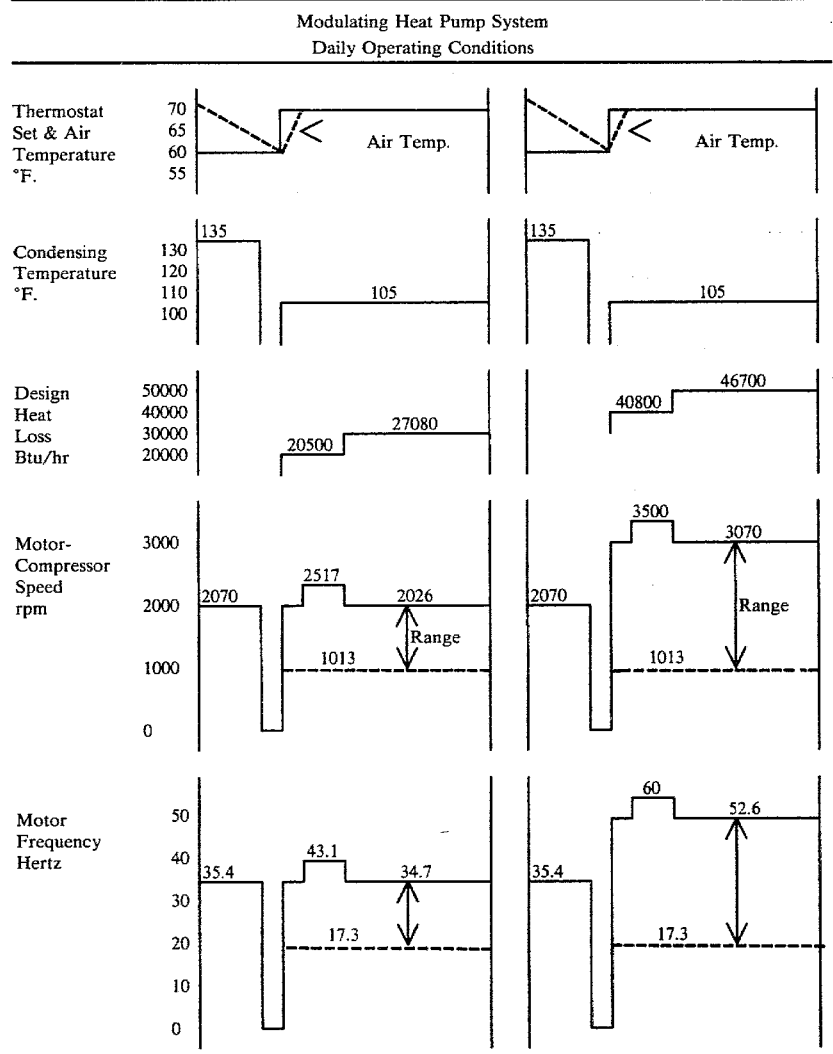

TABLE 1

Modulating Heat Pump System
Daily Operating Conditions

TABLE 1-continued
Modulating Heat Pump System
Daily Operating Conditions

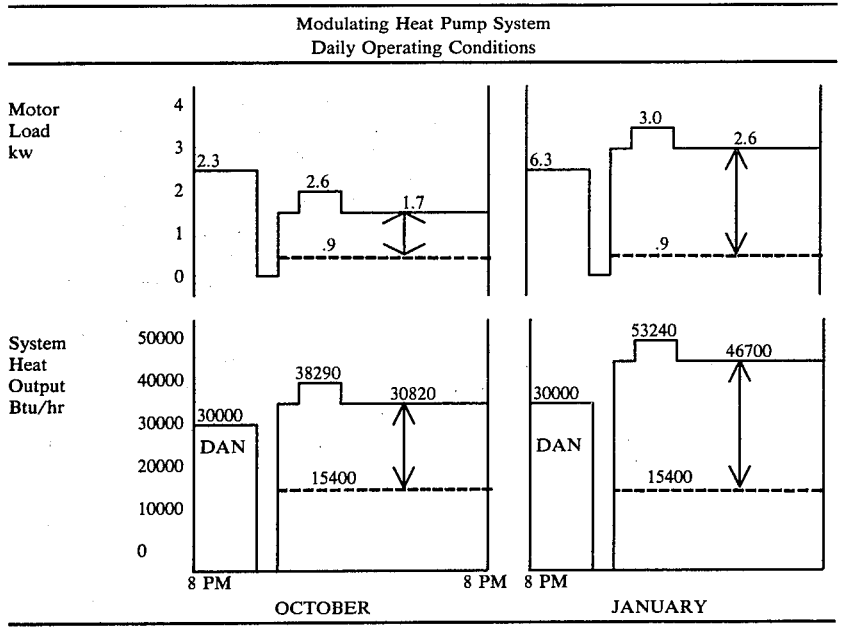

TABLE 2
Electric Load And Cost Analysis
Ohio Edison Co.
Load Management Rate #16

| | | System Number | | | |
|---|---|---|---|---|---|
| | | 1 | 2 | 3 | 4 |
| | | | | | Modulating |
| | Type System | Electric | Heat Pump | Heat Pump | Heat Pump |
| Month | Item | Furnace | Air To Air | Water To Air | System |
| Oct. | Heating kw | 8.0 | 3.3 | 4.3 | 2.5 |
| | Heating kwh Used | 1973 | 650 | 520 | 331 |
| | Total kwh Used | 3173 | 1850 | 1520 | 1202 |
| | Billing Load kw | 15.0 | 10.3 | 11.6 | 5.1 |
| | Well Water Req'd | — | — | 79200 Gal | 29000 |
| | Performance Factor | 1.0 | 3.03 | 3.8 | 5.96 |
| | Cost Of Electricity | $114.40 | 75.47 | 77.41 | 47.38 |
| | Cost Factor | 1.0 | 1.51 | 1.48 | 2.41 |
| | % Reduction vs. #1 | — | −34.0 | −32.3 | −58.6 |
| | % Reduction vs. #2 | — | — | +2.6 | −37.2 |
| | % Reduction vs. #3 | — | — | — | −38.8 |
| Jan. | Heating kw | 14.0 | 12.5 | 4.3 | 2.9 |
| | Heating kwh Used | 5720 | 3532 | 1513 | 959 |
| | Total kwh Used | 7020 | 4832 | 2613 | 1930 |
| | Billing Load kw | 21.0 | 19.6 | 11.6 | 5.4 |
| | Well Water Req'd | — | — | 229750 | 86902 |
| | Performance Factor | 1.0 | 1.62 | 3.8 | 5.96 |
| | Cost Of Electricity | $205.51 | 159.48 | 93.87 | 62.23 |
| | Cost Factor | 1.0 | 1.29 | 21.9 | 3.3 |
| | % Reduction vs. #1 | — | −22.4 | −54.3 | −69.7 |
| | % Reduction vs. #2 | — | — | −41.1 | −61.0 |
| | % Reduction vs. #3 | — | — | — | −33.7 |
| Mar. | Heating kw | 14.0 | 3.3 | 4.3 | 2.5 |
| | Heating kwh Used | 4440 | 1980 | 1174 | 743 |
| | Total kwh Used | 5710 | 3250 | 2244 | 1634 |
| | Billing Load kw | 21.0 | 10.3 | 11.6 | 5.0 |
| | Well Water Req'd | — | — | 178200 | 6700 |
| | Performance Factor | 1.0 | 2.24 | 3.8 | 5.97 |
| | Cost Of Electricity | $180.36 | 102.35 | 86.78 | 56.34 |
| | Cost Factor | 1.0 | 1.76 | 2.08 | 3.2 |
| | % Reduction vs. #1 | — | −43.2 | −51.9 | −68.8 |
| | % Reduction vs. #2 | — | — | −15.2 | −45.0 |
| | % Reduction vs. #3 | — | — | — | −35.1 |

TABLE 3

Home Energy Costs
Heating + Domestic Hot Water + Misc.Elect
Ohio Edison Load Management
Residential Rate #16

| System # | Type System |
|---|---|
| 1 | Electric Furnace |
| 2 | Heat Pump - Air To Air |
| 3 | Heat Pump - Water To Air |
| 4 | Heat Pump - Modulating |
| 5 | Gas Furnace ($2.21 Per 10¢) |
| 6 | Oil Furnace (51.2 ¢/Gal) |

Cost Of Energy Dollars Per Month

| Month | System | Cost Of Energy $/Mo |
|---|---|---|
| October | 1 | 114.40 |
|  | 2 | 75.47 |
|  | 3 | 77.41 |
|  | 4 | 47.38 |
|  | 5 | 65.22 |
|  | 6 | 91.40 |
| January | 1 | 205.51 |
|  | 2 | 159.48 |
|  | 3 | 93.87 |
|  | 4 | 62.23 |
|  | 5 | 108.46 |
|  | 6 | 165.36 |
| March | 1 | 180.36 |
|  | 2 | 102.35 |
|  | 3 | 86.78 |
|  | 4 | 56.34 |
|  | 5 | 93.75 |
|  | 6 | 140.16 |

TABLE 4

Home Heating Systems Breakeven
Analysis For Typical Akron Ohio Home
Using Ohio Edison Co Load Management Rate #16

| Item | Type System | 1 Electric Furnace | 2 Heat Pump Air To Air | 3 Heat Pump Water To Air | 4 Modulating Heat Pump System | 5 Gas Fired Furnace | 6 Oil Fired Furnace |
|---|---|---|---|---|---|---|---|
| 7 Month Energy Costs At Current Costs | | $1081 (1) | 834 (1) | 605 (1) (8) | 394 (9) | 650 (2) (3) (12) | 979 (1) (4) (12) |
| 7 Month Cost Savings mhps vs Other Systems | | $693 | 440 | 211 | — | 256 | 585 |
| 7 Mo. % Savings mhps vs Other Systems | | 63.7% | 52.7 | 34.9 | — | 39.4 | 598 |
| Extra mhps Costs For Break-Even 1st Year | New Construction | $7444 | 4940 | 2673 | — | 2633 | 6375 |
| | Savings & Loan | (5) | (5) | (5) | — | (5) | (5) |
| | Retrofit | 3685 | 2445 | 1323 | — | 1303 | 3155 |
| | pma | (6) | (6) | (6) | — | (6) | (6) |
| | Retrofit | 2632 | 1746 | 945 | — | 931 | 2254 |
| | Bank | (7) | (7) | (7) | — | (7) | (7) |
| Seasonal Cost Factor (Winter) | | 1.0 | 1.3 | 1 8 | 2.76 | 1.67 | 1.11 |

Notes:
(1) Includes Electric D.H.W. Heater
(2) Includes Gas DHW Heater
(3) Based On Current Gas Costs Of $2.21/MCF
(4) Based On Current Oil Costs Of $51.2/Gal.
(5) Based On 25 Year Loan, 9% Interest
(6) Based On 12 Year Loan, 12% Interest
(7) Based On 5 Year Loan, 8¾% Interest
(8) 70% DHW Generated By Heat Pump
(9) 100% DHW Generated And Stored By mhps During Off-Peak Period
(10) Above Analysis Does Not Include mhps Cost Savings For Home Air Conditioning
(11) Above mhps Cost Savings Based On Basic mhps As Shown In FIG. 1
(12) Based On Furnace Efficiency Of 67%

TABLE 5
Zone Heat Storage System
Heatstor ™ Data Sheet

| | |
|---|---|
| Job Name Typical Demo. Unit | Date 5/22/78 |
| Job Location — | Job # — |
| Building Heat Loss 40,000 Btu/hr | Type Salt $Na_2S_2O_3.5H_2O$(w |
| Max. 12 Hour Heat Loss 480,000 Btu | Nucleating Device) |
| Heat Generator ™ Rating 80,000 Btu/hr | Salt Melting Point 119 |
| Heat Generated 6 Hr. Period 480,000 Btu | Salt Density 108 #/CF |
| Entering Water Temp. 135° F. | Salt Heat Of Fusion 90 Btu/CF |
| Entering Water Flow Rate 10.2 GPM | Salt Heat Of Fusion 9720 Btu/CF |
| Heatstor ™ Internal Size 5'8" × 4'0" × 5'8" | Salt Specific Heat: Solid .35 |
| Heatstor ™ Internal Volume 128.6 CF | Salt Specific Heat: Liquid .57 |
| Heatstor ™ Surface Area ($A_1$) 155 SF | Salt Volume .362 CF/100CF |
| Enclosure Insulation Thickness 4" | Salt Volume 47.78 CF |
| Enclosure Insulation ($U_1$) .031 Btu/SF°F. | Tube Temp. Range 130° F. To 115 |
| Tube Material A.B.S. | Tube Temp. Drop 15° F. |
| Tube Size: OD .875 Thickness .030 | Salt Temp. Range And Drop |
| Tube Length 5 Ft. | Solid 120° F. To 115° F. = 5° F. |
| Tube Quanity 2640, 13,200 L.F. | Liquid 130° F. To 120° F. = 10° F. |
| Tube Surface Area ($A_s$) 22.91 SF/100CF 3024 SF | Water Temp. Range 130° F. To 115° F. |
| Tube Material Density 61.7 #/CF | Water Temp Drop 15° F. |
| Tube Specific Heat .4 Btu/#° F. | Tube-Water Temp. Diff. ($\Delta T_1$) 7.5 |
| Tube Material Volume .055 CF/100LF | Salt Heat Absorption (max) 340,200 G |
| Tube Material Volume 7.26 CF | Enclosure Temp. Diff ($\Delta T_1$) 50 |
| Water Density 62.4 #/CF | Enclosure Heat Loss 240.2 Btu |
| Water Specific Heat 1.0 Btu/#° F. | Enclosure Heat Loss 5766 Btu |
| Water Volume 48.83 CF 365 Gal. | Percent Heat Loss 1.05%/DA |
| Salt Surface To Volume Ratio 63.3 | Max. Hrs. To Fill Heatstor ™ 6.9 |
| | Min. Hrs. Of Heating 13.8 |

Heatstor ™ Heat Storage Capacity (1)

| Material | Volume Ratio | Volume C.F. | Weight Lbs. | Specific Heat Btu/°F. | Specific Heat Temp. Drop | Specific Heat Btu | Heat Of Fusion, Btu | Total Btu |
|---|---|---|---|---|---|---|---|---|
| Salt | .46 | 47.78 | 5160 | Solid 1806 | 5 | 9030 | 464,400 | 5028 |
| | | | | Liquid 2941 | 10 | 29410 | | |
| Tubes | .07 | 7.26 | 448 | 179 | 15 | 2688 | — | 268 |
| Water | .47 | 48.83 | 3047 | 3047 | 15 | 45705 | — | 4570 |
| Totals | 100 | 103.87 | 8655 | — | — | 86833 | 464,400 | 5512 |

Salt Heat Absorption = $U_sA_s \Delta T_t = 15A_s\Delta T_t$ Water 7.48 Gal./CF
Enclosure Heat Loss = $U_1A_1\Delta T_1$
(1) Not Including Domestic Hot Water Tank

What is claimed is:

1. A heating and cooling system for use in a dwelling comprising,
    a fluid source of heat,
    a source of fluid heat transfer media,
    a closed circuit heat transfer system comprising
    a recirculating thermosiphon heat transfer unit having an inner pipe disposed within an outer pipe to define a coaxial pipe having an annulus therebetween, said pipes being coiled to form a coil helix,
    container means for holding a fixed level of a liquid phase of the fluid heat transfer media,
    one end of said inner pipe being connected to the bottom of said container means with the liquid phase of said fluid heat transfer media flowing therethrough,
    the opposite end of said inner pipe being connected to said container means above the level of the liquid phase of said fluid heat transfer media,
    the outer of said pipes being connected at its one end to the pipes containing the source of fluid heat,
    the opposite end of said outer pipe being connected to means to enable a self-draining flow of said fluid heat source through said annulus,
    variable capacity compressor means connecting with said container means being operable to move the fluid heat transfer media through said system at a controllable mass rate,
    the input of said compressor means being connected with said container means above the level of the fluid phase of said media disposed therein,
    the flow of said fluid heat source being effective to cause at least a partial vaporization of the heat transfer media in said inner pipe being operable to separate said media into a liquid phase and a vapor phase whereby said media flows through said inner pipe absorbing the heat of vaporization,
    the liquid phase of said heat transfer media returning to the lower part of said container means and the vapor phase of said heat transfer media returning to the input of said compressor means,
    and heat exchanger means operatively connected to the output of said compressor for receiving the vapor phase of said heat transfer media and removing heat therefrom.

2. A heating and cooling system as is defined in claim 1 and wherein the pipes are coiled to form a plurality of separate coil helix each having means to control the flow of the fluid heat source therethrough.

3. A heating and cooling system as is defined in claim 2 and wherein the plurality of coil helix are interconnected to provide a parallel flow therethrough of the heat transfer media and the fluid heat source.

4. A heating and cooling system as is defined in claim 2 and wherein each of the coil helix is provided with a different size of heat transfer surface area which may be selectively activated to provide various combinations of surface areas effective to modulate the thermosiphon heat transfer unit.

5. A heating and cooling system as is defined in claim 2 and which comprises three separate coil helix each of which has a different size of heat transfer surface area.

* * * * *